US012749714B2

(12) United States Patent
Xiang et al.

(10) Patent No.: US 12,749,714 B2
(45) Date of Patent: Sep. 29, 2026

(54) NON-AQUEOUS ELECTROLYTE AND LITHIUM ION BATTERY

(71) Applicant: SHENZHEN CAPCHEM TECHNOLOGY CO., LTD., Shenzhen (CN)

(72) Inventors: Shuhuai Xiang, Shenzhen (CN); Zhongcang Zhou, Shenzhen (CN); Yang Yi, Shenzhen (CN); Shiguang Hu, Shenzhen (CN)

(73) Assignee: SHENZHEN CAPCHEM TECHNOLOGY CO., LTD., Shenzhen (CN)

( * ) Notice: Subject to any disclaimer, the term of this patent is extended or adjusted under 35 U.S.C. 154(b) by 468 days.

(21) Appl. No.: 18/580,635

(22) PCT Filed: Jun. 20, 2022

(86) PCT No.: PCT/CN2022/099750
§ 371 (c)(1),
(2) Date: Jan. 19, 2024

(87) PCT Pub. No.: WO2023/000889
PCT Pub. Date: Jan. 26, 2023

(65) Prior Publication Data
US 2025/0087749 A1 Mar. 13, 2025

(30) Foreign Application Priority Data
Jul. 22, 2021 (CN) ......................... 202110834008.8

(51) Int. Cl.
*H01M 10/0567* (2010.01)
*H01M 10/0525* (2010.01)
*H01M 10/0568* (2010.01)
*H01M 10/0569* (2010.01)
*H01M 10/42* (2006.01)

(52) U.S. Cl.
CPC .................. *H01M 10/0567* (2013.01); *H01M 10/0525* (2013.01); *H01M 10/0568* (2013.01); *H01M 10/0569* (2013.01); *H01M 10/4235* (2013.01)

(58) Field of Classification Search
CPC ......... H01M 10/0567; H01M 10/0525; H01M 10/0568; H01M 10/0569; H01M 10/4235; H01M 2300/0025; H01M 10/052; H01M 10/42
See application file for complete search history.

(56) References Cited

U.S. PATENT DOCUMENTS 11,127,978 B2 * 9/2021 Son .................... H01M 10/4235
11,881,555 B2 * 1/2024 Hu ..................... H01M 10/0567
12,107,228 B2 * 10/2024 Zheng ............... H01M 10/0525
2015/0086861 A1 * 3/2015 Makhmut ......... H01M 10/0567 429/188
2016/0211550 A1 * 7/2016 Cha ................... H01M 10/0525
2016/0359196 A1 * 12/2016 Kim .................. H01M 10/0569

FOREIGN PATENT DOCUMENTS

| | | | |
|---|---|---|---|
| CN | 107408734 | A | 11/2017 |
| CN | 111403807 | A | 7/2020 |
| CN | 113054250 | A | 6/2021 |
| CN | 113130989 | A | 7/2021 |
| CN | 114068936 | A | 2/2022 |
| CN | 114094109 | A | 2/2022 |
| CN | 114464887 | A | 5/2022 |
| CN | 114497692 | A | 5/2022 |
| EP | 3205655 | A1 | 8/2017 |
| WO | 2020140923 | A1 | 7/2020 |

OTHER PUBLICATIONS

European Search Report of European Patent Application No. 22845054.0 issued on Sep. 2, 2025.
International search report of PCT Patent Application No. PCT/CN2022/099750 issued on Sep. 2, 2022.

* cited by examiner

*Primary Examiner* — Michael L Dignan

(57) ABSTRACT

The application relates to the technical field of lithium ion batteries, in particular to a non-aqueous electrolyte and a lithium ion battery. In order to overcome the technical problem of poor high-temperature performance of the existing lithium ion battery, the application provides a non-aqueous electrolyte, comprising a solvent, a lithium salt and at least one of bicyclic compound represented by structural formulas 1-1 to 1-3:

Structural formula 1-1

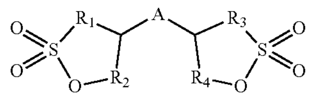

Structural formula 1-2

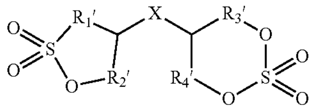

Structural formula 1-3

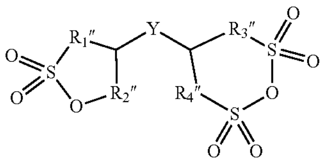

Meanwhile, the application also discloses a lithium ion battery comprising the non-aqueous electrolyte. The non-aqueous electrolyte and the lithium ion battery provided by the application can effectively improve the high-temperature cycle performance and high-temperature storage performance of battery.

10 Claims, No Drawings

NON-AQUEOUS ELECTROLYTE AND LITHIUM ION BATTERY

TECHNICAL FIELD

The application relates to the technical field of lithium ion batteries, in particular to a non-aqueous electrolyte and a lithium ion battery.

BACKGROUND

With the increasingly high performance requirements of electric vehicles and hybrid electric vehicles, the performance of power batteries, especially the high temperature performance, is facing more challenges. At present, the main power batteries are lithium ion batteries, and the core of lithium ion battery is mainly composed of positive electrode, negative electrode, diaphragm and electrolyte. During the charging process of lithium ion battery, lithium ions of the positive electrode material are deintercalated and embedded into the carbon negative electrode through electrolyte. In the initial stage, electrolyte components will get electrons first, and react on the surface of carbon negative electrode to produce compounds such as $Li_2CO_3$, $Li_2O$ and LiOH, thus forming a passivation film on the surface of negative electrode, which is called solid electrolyte interface film (SEI). SEI film formed in the initial charging process can prevent the electrolyte from further decomposition on the surface of carbon negative electrode, and also acts as a lithium ion conductor, allowing only lithium ions to pass through. However, in the following charge-discharge cycle of lithium ion battery, the electrode may change, resulting in the rupture of SEI film, which may cause the negative electrode to be exposed to the electrolyte again and continue to react with the electrolyte. Thus generating gas while consuming electrolyte, which leads to the increase of internal pressure of lithium ion battery and reduces the cycle life of battery. When the battery is stored or recharged at high temperature, the change of electrode volume becomes more obvious, and the SEI film is more prone to rupture, which leads to the obvious decline of electrochemical performance of lithium ion battery at high temperature. Therefore, the quality of SEI film seriously affects the high-temperature performance of lithium ion batteries.

In order to improve the performance of lithium ion battery, many researchers have tried to improve the quality of SEI film by adding different negative film-forming agents to the electrolyte, such as fluoroethylene carbonate, vinylethylene carbonate, 1,3-propane sultone and other additives. However, although the existing film-forming additives can improve a certain performance of battery, the improvement effect seems limited, especially the high-temperature cycle performance and storage performance, which still cannot meet the needs of the market. How to develop an additive that can further improve the high-temperature cycle performance and storage performance is an urgent problem to be solved.

SUMMARY

Aiming at the problems of poor high-temperature cycle performance and high-temperature storage performance of the existing lithium ion battery, the application provides a non-aqueous electrolyte and a battery.

The technical solutions adopted by the application are as follows.

In one aspect, the application provides a non-aqueous electrolyte, which comprises a solvent, a lithium salt and at least one of bicyclic compound represented by structural formulas 1-1 to 1-3:

Structural formula 1-1

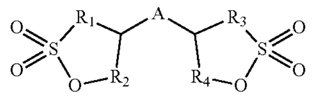

wherein A is selected from a carbonyl group, a C1-C10 hydrocarbon group, a C1-C10 halogenated hydrocarbon group or a C2-C10 carbonyl-containing hydrocarbon group, $R_1$, $R_2$, $R_3$ and $R_4$ are each independently selected from a single bond, a C1-C5 hydrocarbon group or a C1-C5 halogenated hydrocarbon group; preferably, A is selected from a carbonyl group, a C1-C6 hydrocarbon group, a C1-C6 halogenated hydrocarbon group or a C2-C6 carbonyl-containing hydrocarbon group, and $R_1$, $R_2$, $R_3$ and $R_4$ are each independently selected from a single bond, a C1-C3 hydrocarbon group or a C1-C3 halogenated hydrocarbon group.

Structural formula 1-2

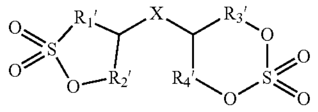

wherein X is selected from a single bond, a carbonyl group, a C1-C10 hydrocarbon group, a C1-C10 halogenated hydrocarbon group or a C2-C10 carbonyl-containing hydrocarbon group, $R_1'$, $R_2'$, $R_3'$ and $R_4'$ are each independently selected from a single bond, a C1-C5 hydrocarbon group or a C1-C5 halogenated hydrocarbon group; preferably, X is selected from a single bond, a carbonyl group, a C1-C6 hydrocarbon group, a C1-C6 halogenated hydrocarbon group or a C2-C6 carbonyl-containing hydrocarbon group, and $R_1'$, $R_2'$, $R_3'$ and $R_4'$ are independently selected from a single bond, a C1-C3 hydrocarbon group or a C1-C3 halogenated hydrocarbon group;

Structural formula 1-3

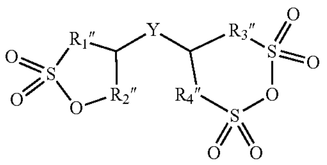

wherein Y is selected from a single bond, a carbonyl group, a C1-C10 hydrocarbon group, a C1-C10 halogenated hydrocarbon group or a C2-C10 carbonyl-containing hydrocarbon group, and $R_1''$, $R_2''$, $R_3''$ and $R_4''$ are each independently selected from a single bond, a C1-C5 hydrocarbon group or a C1-C5 halogenated hydrocarbon group; preferably, Y is selected from a single bond, a carbonyl group, a C1-C6 hydrocarbon group, a C1-C6 halogenated hydrocarbon group or a C2-C6 carbonyl-containing hydrocarbon group, and $R_1''$, $R_2''$, $R_3''$ and $R_4''$ are each independently selected from a single bond, a C1-C3 hydrocarbon group or a C1-C3 halogenated hydrocarbon group.

The bicyclic compound represented by structural formula 1-1, structural formula 1-2 or structural formula 1-3 is used as an additive, which can greatly improve the film formation of non-aqueous electrolyte on the positive and negative electrodes with a small addition amount. The formed passivation film has great flexibility, high stability and relatively slow impedance growth, which improves the performance stability of positive and negative electrode materials in the long-term cycle and prolongs the cycle life of battery. Moreover, it should be noted that, compared with certain existing conventional additives, the stability of the passivation film of the present application is particularly excellent at high temperature. Therefore, the battery obtained by using the non-aqueous electrolyte provided by the application is particularly suitable for working at high temperature, and the environmental adaptability of the battery is improved.

Because the film-forming mechanism of the positive and negative electrodes is complicated, the mechanism of the bicyclic compounds represented by structural formulas 1-1 to 1-3 to improve the performance of the passivation film is not very clear, but the speculation of its mechanism of action is as follows. 1. The bicyclic compounds represented by structural formulas 1-1 to 1-3 could undergo reduction reaction on the negative electrode to generate multivalent anion free radicals, and the multivalent anion free radicals further react to form a multivalent salt with larger molecular weight. The multivalent salt would form a regular SEI film with a network structure on the surface of the negative electrode, and the surface of the SEI film has great flexibility. Even at high temperature, the SEI film is not easy to break, and the impedance increase is relatively slow, which can effectively slow down the decomposition of electrolyte solvent on the negative electrode and reduce the generation of gas, thus improving the electrochemical performance of lithium ion batteries at high temperature. 2. The multivalent anion radicals further react to form a multivalent salt with larger molecular weight. The multivalent salt has better oxidation resistance, which slows down the oxidation process of electrolyte, thus significantly improving the high-temperature cycle performance and high-temperature storage performance of lithium ion batteries. 3. For the bicyclic compounds represented by structural formulas 1-1 to 1-3, because the two cyclic structures do not share carbon atoms, the symmetrical distribution of polar groups is reduced, and the possibility of symmetrical distribution of charges in molecules is reduced, so that the bicyclic compound is easier to coordinate with lithium ions than those molecules with higher symmetry. They arrive at the negative electrode for reduction under the action of electric field, which helps to form a more stable SEI film on the electrode surface and improve the high-temperature performance of lithium-ion batteries.

It should be noted that in the case that A, X and Y are selected from a hydrocarbyl group or a halogenated hydrocarbyl group, the hydrocarbyl group may be a linear hydrocarbyl group, a branched hydrocarbyl group or a cyclic hydrocarbyl group. In the case that $R_1$, $R_2$, $R_3$, $R_4$, $R_1'$, $R_2'$, $R_3'$, $R_4'$, $R_1''$, $R_2''$, $R_3''$ and $R_4''$ are each independently selected from a hydrocarbon group or a halogenated hydrocarbon group, the hydrocarbon group may also be a linear hydrocarbon group, a branched hydrocarbon group or a cyclic hydrocarbon group. When A, X, Y or $R_1$, $R_2$, $R_3$, $R_4$, $R_1'$, $R_2'$, $R_3'$, $R_4'$, $R_1''$, $R_2''$, $R_3''$ or $R_4''$ is selected from a halogenated hydrocarbon group, a fluorinated hydrocarbon group is preferred.

Preferably, the bicyclic compound represented by structural formula 1-1 is selected from one or more of the following compounds:

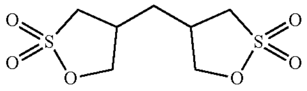

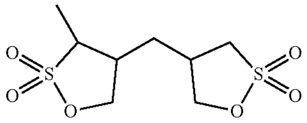

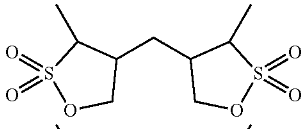

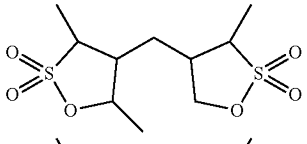

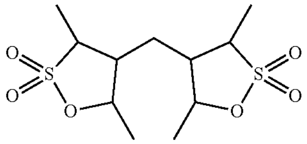

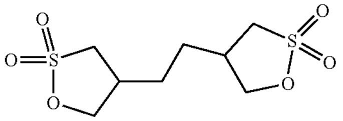

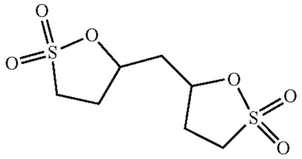

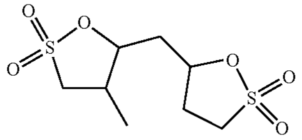

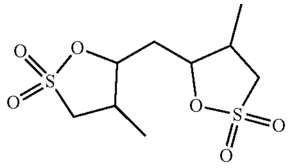

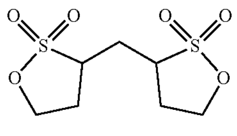
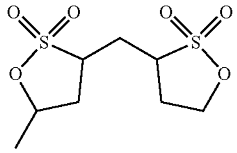

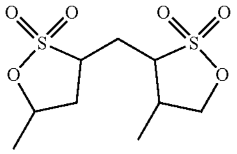
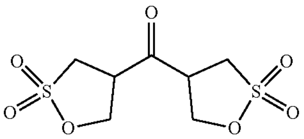

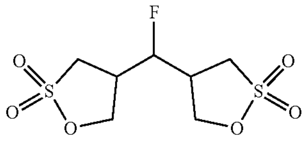

-continued
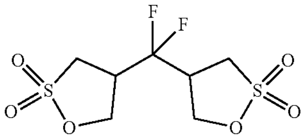
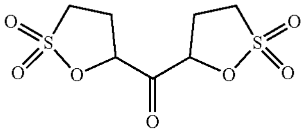
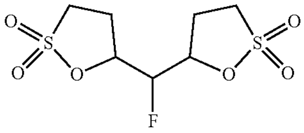
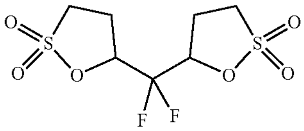
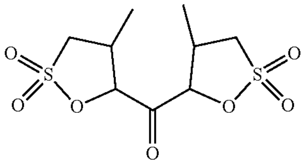
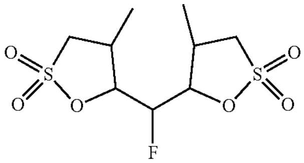
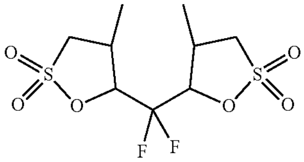
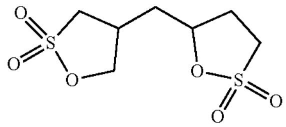
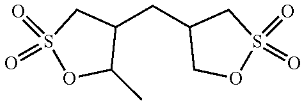
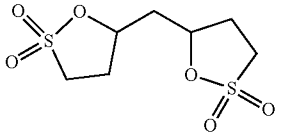
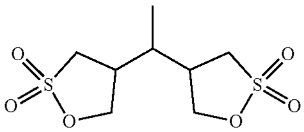
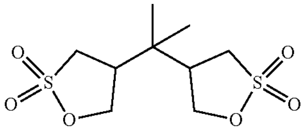
-continued
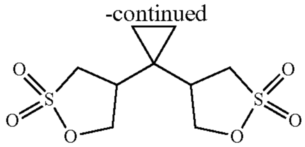
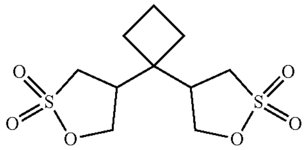
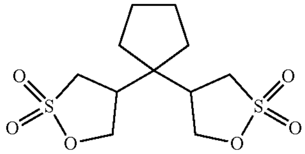
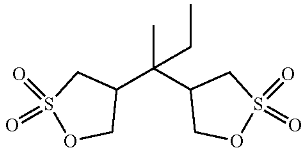
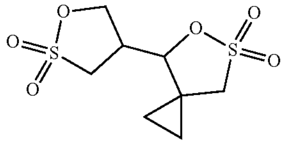
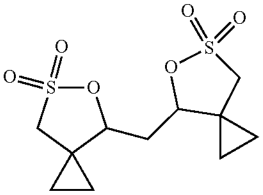
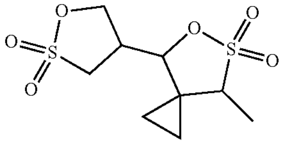
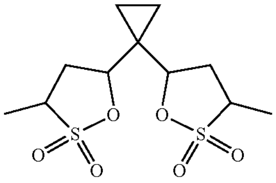
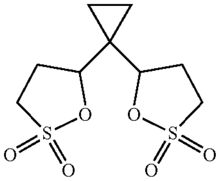
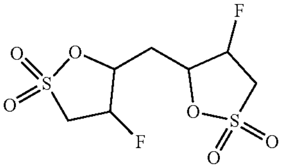
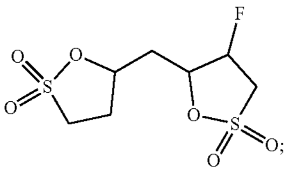
the bicyclic compound represented by structural formula 1-2 is selected from one or more of the following compounds:
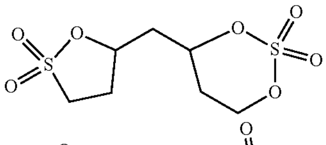
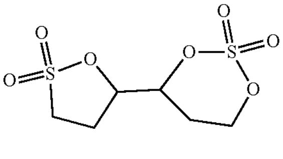

-continued
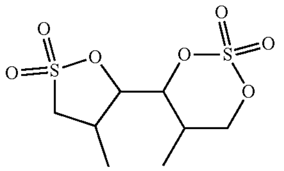
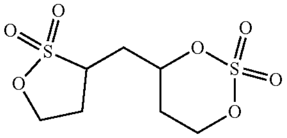
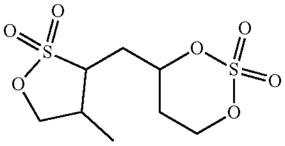
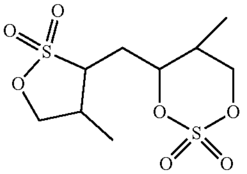
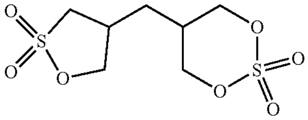
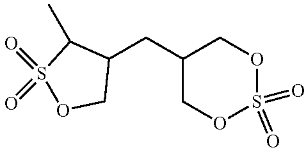
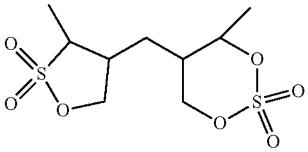
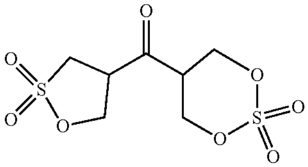
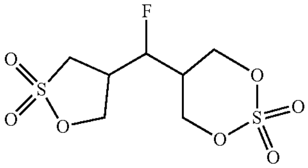
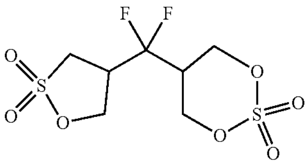
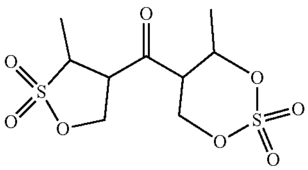
-continued
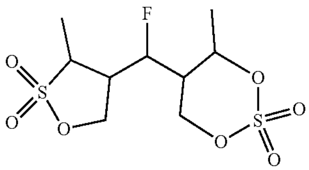
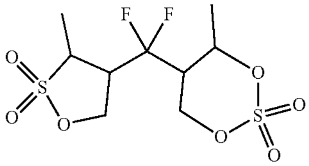
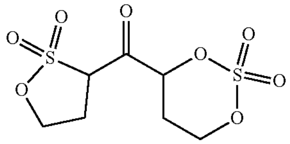
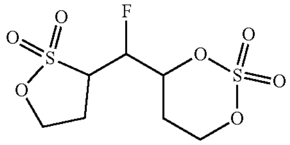
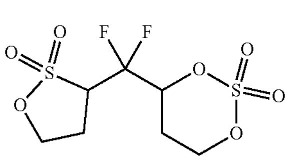
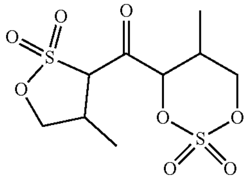
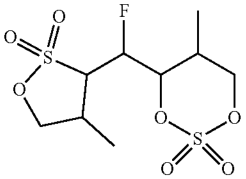
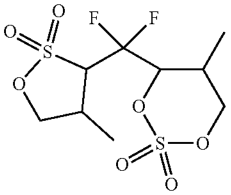
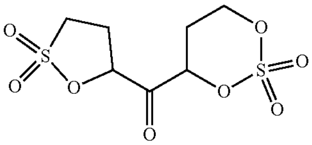
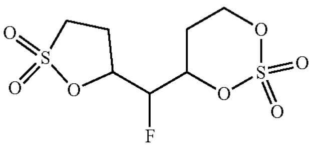
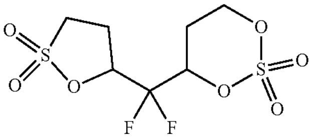
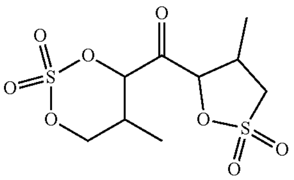

-continued
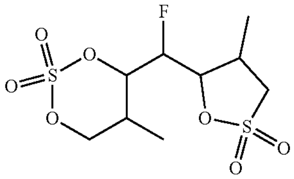
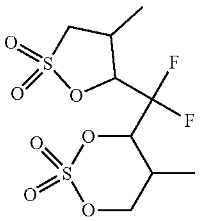
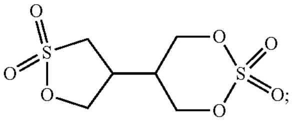
;
the bicyclic compound represented by structural formula 1-3 is selected from one or more of the following compounds:
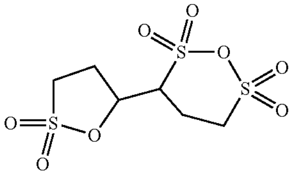
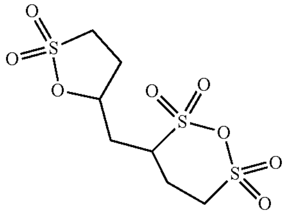
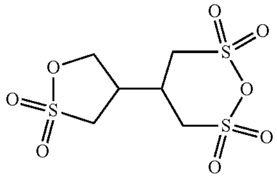
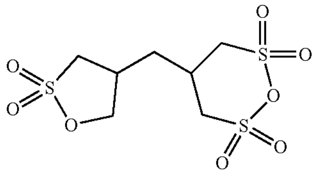
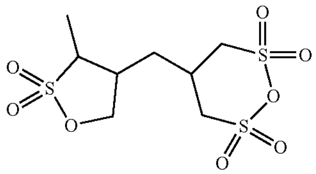
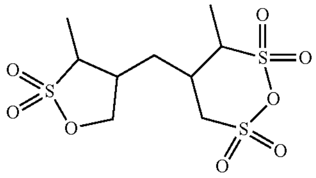
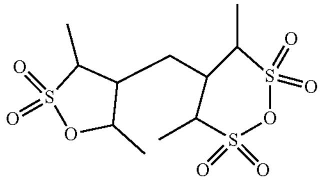
-continued
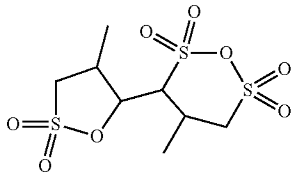
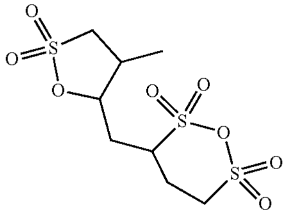
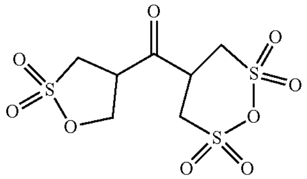
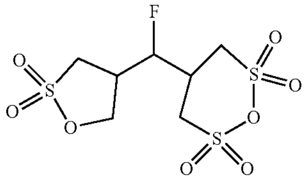
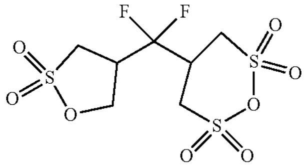
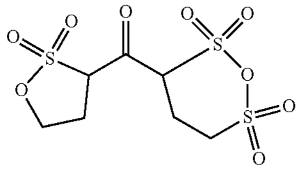
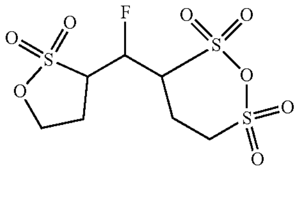
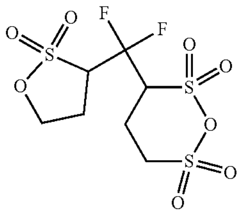
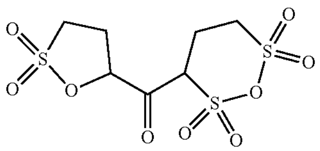
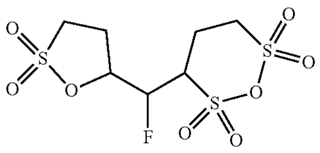

-continued

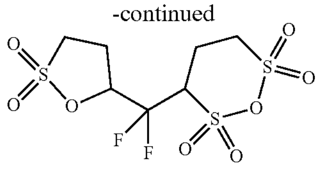

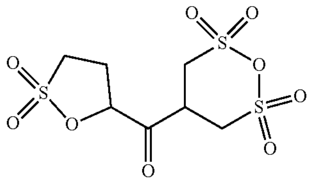

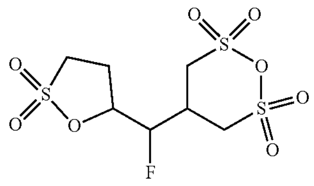

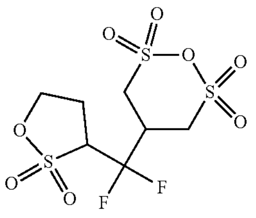

Preferably, the mass percentage of the bicyclic compound is 0.01%-5.0% based on the total mass of the non-aqueous electrolyte being 100%. When the mass percentage of bicyclic compounds is less than 0.01%, a complete passivation film cannot be formed on the surface of negative electrode, so it is difficult to significantly improve the high-temperature performance of the non-aqueous electrolyte battery. However, when the mass percentage of the bicyclic compound is higher than 5.0%, an excessively thick SEI passivation film is likely to be formed on the surface of negative electrode, which would increase the interfacial impedance and deteriorate the high-temperature performance of battery.

More preferably, the mass percentage of the bicyclic compound is 0.1%-3.0% based on the total mass of the non-aqueous electrolyte being 100%. When the mass percentage of the bicyclic compound is 0.5%-3.0%, the electrochemical performance of the prepared lithium ion battery is more excellent.

Preferably, the non-aqueous electrolyte further comprises at least one of cyclic sulfate compound, cyclic sulfonate compound, cyclic carbonate compound, unsaturated phosphate compound and nitrile compound. These substances are additives of electrolyte, which can form a more stable SEI film on the surface of graphite negative electrode, thus significantly improving the cycle performance of lithium ion batteries.

Preferably, the cyclic sulfate compounds include at least one of ethylene sulfate, propylene sulfate or methyl ethylene sulfate. The mass percentage of the cyclic sulfate compound is 0.01%-10%, preferably 0.1%-5%, more preferably 0.5%-3% based on the total mass of the non-aqueous electrolyte being 100%.

Preferably, the cyclic carbonate compound comprises at least one of vinylene carbonate (VC), vinylethylene carbonate (VEC), fluoroethylene carbonate (FEC) or a compound represented by structural formula 2;

Structural formula 2

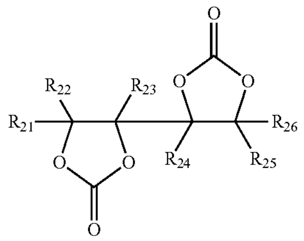

in structural formula 2, $R_{21}$, $R_{22}$, $R_{23}$, $R_{24}$, $R_{25}$ and $R_{26}$ are each independently selected from one of a hydrogen atom, a halogen atom and a C1-C5 group.

More preferably, the compound represented by structural formula 2 includes at least one of the following compounds 2-1 to 2-6:

Compound 2-1

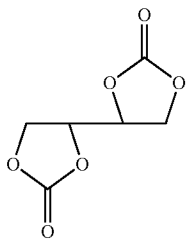

Compound 2-2

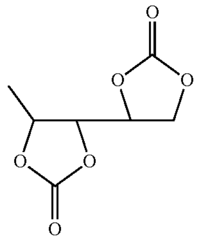

Compound 2-3

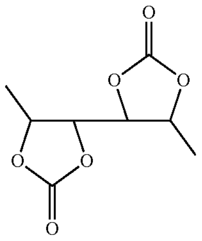

Compound 2-4

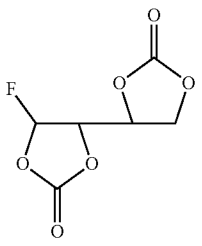

-continued

Compound 2-5

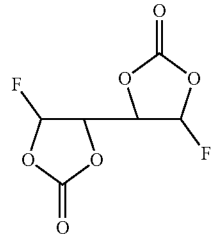

Compound 2-6

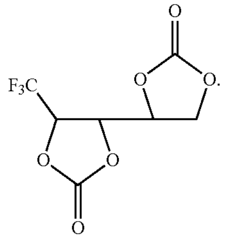

The cyclic carbonate compound could form a film together with the one of the bicyclic compounds represented by structural formulas 1-1 to 1-3, and have a synergistic effect, thereby forming a passivation film with lower impedance and further improving the high-temperature performance of the lithium ion battery. Apparently, it should be understood that the specific type of the cyclic carbonate compound is not limited in the present application.

More preferably, the mass percentage of the cyclic carbonate compound is usually 0.01%-10%, preferably 0.1%-5%, more preferably 0.5%-3% based on the total mass of the non-aqueous electrolyte being 100%. Specifically, the mass percentage of fluoroethylene carbonate (FEC) is usually 0.01-30%, preferably 0.1-10%, and more preferably 0.5-5%.

Preferably, the unsaturated phosphate compound is selected from at least one of the compounds represented by structural formula 3:

Structural formula 3

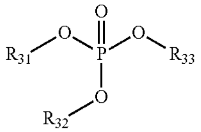

$R_{31}$, $R_{32}$ and $R_{32}$ are each independently selected from a C1-C5 saturated hydrocarbon group, a C1-C5 unsaturated hydrocarbon group, a C1-C5 halogenated hydrocarbon group and —$Si(C_mH_{2m+1})_3$, m is a natural number of 1-3, and at least one of $R_{31}$, $R_{32}$ and $R_{32}$ is an unsaturated hydrocarbon group.

More preferably, the unsaturated phosphate compounds may be at least one selected from the group consisting of phosphoric acid tripropargyl ester, dipropargyl methyl phosphonate, dipropargyl ethyl phosphate, dipropargyl propyl phosphate, dipropargyl trifluoromethyl phosphate, dipropargyl-2,2,2-trifluoroethyl phosphate, dipropargyl-3,3,3-trifluoropropyl phosphate, dipropargyl hexafluoroisopropyl phosphate, phosphoric acid triallyl ester, diallyl methyl phosphate, diallyl ethyl phosphate, diallyl propyl phosphate, diallyl trifluoromethyl phosphate, diallyl-2,2,2-trifluoroethyl phosphate, diallyl-3,3,3-trifluoropropyl phosphate or diallyl hexafluoroisopropyl phosphate.

The unsaturated phosphate compound represented by structural formula 3 is used as a positive electrode film-forming additive to participate in the formation of a passivation film on the surface of positive electrode material. The passivation film isolates the interface between the electrolyte and the positive electrode, which can inhibit the side reaction of the interface between the electrolyte and the positive electrode, and play a protection role for the positive electrode. Meanwhile, the dissolution of transition metal in the positive electrode material is inhibited, and the issues of impedance growth and capacity loss of battery are improved. In addition, the unsaturated phosphate ester represented by structural formula 3 has synergistic effect with the compounds represented by structural formulas 1-1 to 1-3, forming a dense and stable SEI film on the surface of negative electrode, which effectively prevents the reduction reaction of the electrolyte on the surface of negative electrode and the deposition of transition metals, thus improving the interface between the negative electrode and the electrolyte, and slowing down the side reaction of the electrode interface during storage or cycle process, thereby further improving the high-temperature storage performance and high-temperature cycle performance of battery. Preferably, the content (weight percentage) of unsaturated phosphate compound is 0.1%-2.0% based on the total mass of the non-aqueous electrolyte being 100%. When the weight percentage of unsaturated phosphate compound in non-aqueous electrolyte is 0.1%-2.0%, it can promote the formation of SEI film. When the weight percentage of unsaturated phosphate compound in non-aqueous electrolyte is less than 0.1% or more than 2.0%, the improvement effect of SEI film on the electrode would be reduced.

The nitrile compound comprises one or more of butanedinitrile, glutaronitrile, ethylene glycol bis (propionitrile) ether, hexanetricarbonitrile, adiponitrile, pimelic dinitrile, hexamethylene dicyanide, azelaic dinitrile and sebaconitrile.

Through a large number of experiments, the inventors found that the one of the bicyclic compounds represented by structural formulas 1-1 to 1-3 provided by the application, when used in combination with the above additives, have an obvious synergistic effect in improving the high-temperature cycle performance of battery. It indicates that the bicyclic compounds represented by structural formulas 1-1 to 1-3 and the above additives can form a film together on the electrode surface, which can make up for the film-forming defect of using one additive alone and obtain a more stable passivation film, thus improving the cycle performance and high-temperature storage performance of battery through synergy.

Preferably, the lithium salt is selected from at least one of $LiPF_6$, LiBOB, LiDFOB, $LiPO_2F_2$, $LiBF_4$, $LiSbF_6$, $LiAsF_6$, $LiN(SO_2CF_3)_2$, $LiN(SO_2C_2F_5)_2$, $LiC(SO_2CF_3)_3$, $LiN(SO_2F)_2$ and LiBETI.

The content of lithium salt may vary in a wide range. Preferably, the content of lithium salt in the non-aqueous electrolyte of lithium ion battery is 0.1%-15%, preferably 1%-13%, and more preferably 2%-10%.

Preferably, the solvent includes one or more of ether solvent, nitrile solvent, carbonate solvent and carboxylic acid solvent.

In some embodiments, the ether solvent includes a cyclic ether or a chain ether. The cyclic ether may be but not limited to one or more of 1,3-dioxolane (DOL), 1,4-dioxooxane (DX), crown ether, tetrahydrofuran (THF), 2-methyltetrahydrofuran (2-CH3-THF) and 2-trifluoromethyltetrahydrofuran (2-CF3-THF); and the chain ether may be one or more of dimethoxymethane (DMM), 1,2-dimethoxyethane (DME) and diethylene glycol dimethyl ether (TEGDME). The nitrile solvent may be, but is not limited to, one or more of glutaronitrile and malononitrile. The carbonate solvent includes a cyclic carbonate or a chain carbonate. The cyclic carbonate may be but not limited to one or more of ethylene carbonate (EC), propene carbonate (PC), γ-butyrolactone (GBL) and butylene carbonate (BC). The chain carbonate may be but not limited to one or more of dimethyl carbonate (DMC), ethyl methyl carbonate (EMC), diethyl carbonate (DEC) and dipropyl carbonate (DPC). The carboxylic acid solvent may be but not limited to one or more of methyl acetate (MA), ethyl acetate (EA), n-propyl acetate (EP), butyl acetate, propyl propionate (PP) and butyl propionate.

More preferably, the solvent includes one or more of ethylene carbonate, propene carbonate, butylene carbonate, dimethyl carbonate, diethyl carbonate, ethyl methyl carbonate and methyl propyl carbonate.

In another aspect, the application also provides a lithium ion battery, which comprises a positive electrode, a negative electrode, a separator and the non-aqueous electrolyte described above.

Preferably, the positive electrode comprises a positive electrode active material selected from at least one of $LiNi_xCo_yMn_zM_{1-x-y-z}O_2$, $LiCo_{1-y}M_yO_2$, $LiNi_{1-y}M_yO_2$, $LiMn_{2-y}M_yO_4$ and $LiFe_{1-x'}N_{x'}PO_4$; M is selected from at least one of Fe, Co, Ni, Mn, Mg, Cu, Zn, Al, Sn, B, Ga, Cr, Sr, V or Ti, and $0 \le y \le 1$, $0 < x < 1$, $0 \le z \le 1$, $x+y+z \le 1$; and N is selected from at least one of Mn, Mg, Co, Ni, Cu, Zn, Al, Sn, B, Ga, Cr, Sr, V or Ti, and $0 \le x' < 1$.

Preferably, the positive electrode active material is selected from at least one of $LiCoO_2$, $LiNiO_2$, $LiMn_2O_4$, $LiFePO_4$, $LiFe_{0.2}M_{0.8}PO_4$, $LiFe_{0.4}Co_{0.6}PO_4$, $LiFe_{0.6}Ni_{0.4}PO_4$, $LiFe_{0.8}Cu_{0.2}PO_4$ and $LiFe_{0.7}Zn_{0.3}PO_4$.

Preferably, the positive electrode further comprises a positive electrode current collector for extracting current, and the positive electrode active material covers the positive electrode current collector.

Preferably, the negative electrode comprises a negative electrode active material. The negative electrode active material may be made of carbon materials, metal alloys, lithium-containing oxides and silicon-containing materials.

Preferably, the negative electrode further comprises a negative electrode current collector for extracting current, and the negative electrode active material covers the negative electrode current collector.

Preferably, the separator is arranged between the positive electrode and the negative electrode. The separator is a conventional diaphragm in the field of lithium ion batteries, and may be a polymer membrane, a non-woven fabric, etc., including but not limited to single-layer PP (polypropylene), single-layer PE (polyethylene), double-layer PP/PE, double-layer PP/PP, triple-layer PP/PE/PP and other diaphragms.

The non-aqueous electrolyte and the lithium ion battery provided by the application contain bicyclic compounds represented by structural formula 1-1, structural formula 1-2 or structural formula 1-3, which can greatly improve the film formation of the non-aqueous electrolyte on the positive and negative electrodes with a small addition amount. The formed passivation film has great flexibility, high stability and relatively slow impedance growth, which improves the performance stability of positive and negative electrode materials in the long-term cycle and prolongs the cycle life of battery. Moreover, it should be noted that, compared with certain existing conventional additives, the stability of the passivation film of the present application is particularly excellent at high temperature. Therefore, the battery obtained by using the non-aqueous electrolyte provided by the application is particularly suitable for working at high temperature, and the environmental adaptability of the battery is improved.

DETAILED DESCRIPTION OF PREFERRED EMBODIMENTS

The technical solutions in the embodiments of the present application will be clearly and completely described below with reference to the embodiments of this application. Obviously, the described embodiments are merely part of the embodiments of this application, not all of them. Based on the embodiments in this application, all other embodiments obtained by those of ordinary skill in the art without creative effort belong to the protection scope of this application.

The present application will be further illustrated with the following embodiments.

TABLE 1

| | |
|---|---|
| 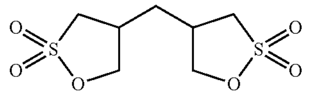 [SMILES: O=S1(=O)CC(CC2COS(=O)(=O)C2)CO1] | Compound 1 |
| 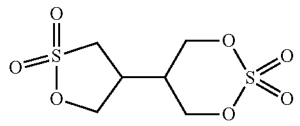 [SMILES: O=S1(=O)CC(C2COS(=O)(=O)OC2)CO1] | Compound 2 |
| 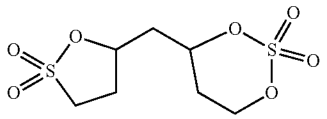 [SMILES: O=S1(=O)CCC(CC2CCOS(=O)(=O)O2)O1] | Compound 3 |
| 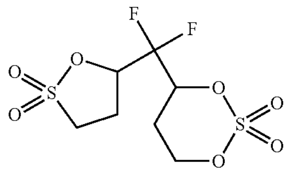 [SMILES: O=S1(=O)CCC(C(F)(F)C2CCOS(=O)(=O)O2)O1] | Compound 4 |
| 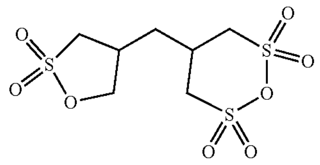 [SMILES: O=S1(=O)CC(CC2CS(=O)(=O)OS(=O)(=O)C2)CO1] | Compound 5 |
| 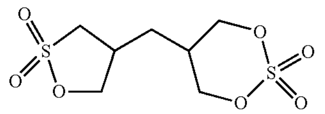 [SMILES: O=S1(=O)CC(CC2COS(=O)(=O)OC2)CO1] | Compound 6 |
| 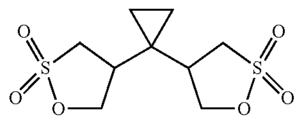 [SMILES: O=S1(=O)CC(C2(C3COS(=O)(=O)C3)CC2)CO1] | Compound 7 |
| 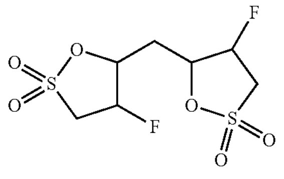 [SMILES: O=S1(=O)CC(F)C(CC2OS(=O)(=O)CC2F)O1] | Compound 8 |

TABLE 1-continued

Compound 9

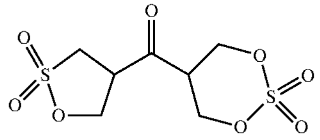 [SMILES: O=C(C1COS(=O)(=O)OC1)C1COS(=O)(=O)C1]

Compound 10

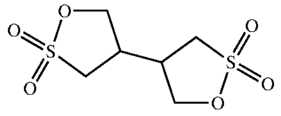 [SMILES: O=S1(=O)CC(C2COS(=O)(=O)C2)CO1]

Compound 11

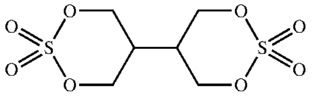 [SMILES: O=S1(=O)OCC(C2COS(=O)(=O)OC2)CO1]

Compound 12

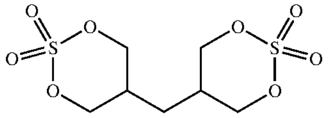 [SMILES: O=S1(=O)OCC(CC2COS(=O)(=O)OC2)CO1]

Note:
Compounds 1 to 12 adopted in the following embodiments and comparative examples are selected from Table 1.

Embodiment 1

1) Preparation of Non-Aqueous Electrolyte

Ethylene carbonate (EC), diethyl carbonate (DEC) and ethyl methyl carbonate (EMC) were mixed according to the mass ratio of EC:DEC:EMC=1:1:1, and then lithium hexafluorophosphate ($LiPF_6$) was added until the molar concentration was 1 mol/L. Based on the total mass of the non-aqueous electrolyte being 100%, the mass percentage of Embodiment 1 shown in Table 2 were added.

2) Preparation of Positive Plate

According to the mass ratio of 93:4:3, positive electrode active material Li-Ni-Mn-Co oxide $LiNi_{0.5}Co_{0.2}Mn_{0.3}O_2$, conductive carbon black Super-P and binder polyvinylidene fluoride (PVDF) were mixed, and then the mixture was dispersed in N-methyl-2-pyrrolidone (NMP) to obtain a positive electrode slurry. The slurry was evenly coated on both sides of an aluminum foil, dried, calendered and vacuum-dried, and an aluminum lead wire was welded by an ultrasonic welding machine to obtain a positive electrode plate with a thickness of 120-150 μm.

3) Preparation of Negative Plate

According to the mass ratio of 94:1:2.5:2.5, negative electrode active material of artificial graphite, conductive carbon black Super-P, binder styrene-butadiene rubber (SBR) and carboxymethyl cellulose (CMC) were mixed, and then the mixture was dispersed in deionized water to obtain a negative electrode slurry. The slurry was coated on both sides of the copper foil, dried, calendered and vacuum-dried, and a nickel lead wire was welded by an ultrasonic welding machine to obtain a negative electrode plate with a thickness of 120-150 μm.

4) Preparation of Battery Core

A three-layer diaphragm with a thickness of 20 μm was placed between the positive plate and the negative plate as a separator. And then the sandwich structure composed of the positive plate, the negative plate and the separator was wound. Then the winding body was flattened and put into an aluminum foil packaging bag and baked in vacuum at 75° C. for 48 hours to obtain a battery core to be injected with liquid.

5) Injection and Formation of Battery Core

In a glove box with the dew point controlled below-40° C., the prepared electrolyte was injected into the battery core, vacuum-packaged and left to set for 24 hours.

Then the routine formation of first charge was performed according to the following steps: charged at 0.05 C constant current for 180 min, charged at 0.2 C constant current to 3.95V, and sealed with secondary vacuum, then further charged at 0.2 C constant current to 4.2V, left to set at room temperature for 24hrs, and discharged at 0.2 C constant current to 3.0V to obtain a $LiNi_{0.5}Co_{0.2}Mn_{0.3}O$/artificial graphite lithium ion battery.

Battery Performance Tests (1) High-Temperature Cycle Performance Test

The lithium ion battery prepared in Embodiment 1 was placed in an oven with a constant temperature of 45° C., charged to 4.2V at 1 C constant current ($LiNi_{0.5}Co_{0.2}Mn_{0.3}O_2$/artificial graphite lithium ion battery), then charged at a constant voltage until the current dropped to 0.02 C, and then discharged to 3.0V at 1 C constant current, this step was repeated, and the first discharge capacity and the last discharge capacity were recorded.

The capacity retention rate of cycle is calculated according to the following formula.

$$\text{Battery capacity retention rate (\%)} = \text{last discharge capacity/first discharge capacity} \times 100\%.$$

(2) High-Temperature Storage Performance Test

After the lithium ion battery prepared in Embodiment 1 was formed, it was charged to 4.2 V at 1 C constant current/constant voltage ($LiNi_{0.5}Co_{0.2}Mn_{0.3}O_2$/artificial graphite lithium ion battery) at room temperature, and the initial discharge capacity and initial battery thickness of the battery were measured. After being stored at 60° C. for 30 days, it was discharged to 3.0 V at 1 C, and the retention capacity, recovery capacity and battery thickness after storage were measured. The calculation formulas are as follows.

$$\text{Battery capacity retention rate (\%)} = \text{Retention capacity/Initial capacity} \times 100\%;$$

$$\text{Battery capacity recovery rate (\%)} = \text{Recovery capacity/Initial capacity} \times 100\%;$$

$$\text{Volume expansion rate (\%)} = \text{(Battery thickness after storage} - \text{Initial battery thickness)/Initial battery thickness} \times 100\%.$$

The test results are shown in Table 2.

Embodiments 2-19

Embodiments 2-19 are used to illustrate the non-aqueous electrolyte, lithium ion battery and the preparation methods, including most of the steps in Embodiment 1, with the difference that:

at the preparation step of the non-aqueous electrolyte, the components were added according to the mass percentage of Embodiments 2-19 shown in Table 2, based on the total mass of the non-aqueous electrolyte being 100%. The test result are shown in Table 2.

Comparative Examples 1-9

Comparative examples 1-9 are used to comparatively illustrate the non-aqueous electrolyte, lithium ion battery and the preparation methods, including most of the steps in Embodiment 1, with the difference that:

the components were added according to the mass percentage of Comparative examples 1-9 shown in Table 2, based on the total mass of the non-aqueous electrolyte being 100%. The test result are shown in Table 2.

From the test results of Embodiment 4, Embodiments 8-15 and Comparative examples 2-5, it can be seen that compared with the conventional vinylene carbonate (VC), fluoroethylene carbonate (FEC), ethylene sulfate (DTD) and tripropargyl phosphate, when one of the bicyclic compounds represented by structural formulas 1-1 to 1-3 provided by the application is used as an additive, the storage performance and cycle performance of lithium ion batteries at high temperature can be improved more significantly, and gas production is less. It indicates that the passivation films formed by the bicyclic compounds represented by structural formulas 1-1 to 1-3 have more excellent high-temperature stability.

TABLE 2

| | | | | After storage at 60° C. for 30 days | | |
|---|---|---|---|---|---|---|
| Group | Bicyclic compound and its content (%) | Other additives and contents (%) | Capacity retention rate after 1000 cycles at 45° C. 1 C (%) | Capacity retention rate (%) | Capacity recovery rate (%) | Volume expansion rate (%) |
| Embodiment 1 | Compound 1:0.01 | — | 60.3 | 65.9 | 69.3 | 55.4 |
| Embodiment 2 | Compound 1:0.1 | — | 78.3 | 76.8 | 78.9 | 35.3 |
| Embodiment 3 | Compound 1:0.5 | — | 86.3 | 82.0 | 85.3 | 16.6 |
| Embodiment 4 | Compound 1:1 | — | 88.5 | 84.6 | 88.3 | 11.8 |
| Embodiment 5 | Compound 1:2 | — | 87.6 | 83.5 | 86.3 | 14.9 |
| Embodiment 6 | Compound 1:3 | — | 85.6 | 81.5 | 84.1 | 18.8 |
| Embodiment 7 | Compound 1:5 | — | 81.8 | 78.1 | 80.6 | 20.8 |
| Embodiment 8 | Compound 2:1 | — | 88.2 | 84.2 | 87.5 | 10.8 |
| Embodiment 9 | Compound 3:1 | — | 87.3 | 83.5 | 86.8 | 11.2 |
| Embodiment 10 | Compound 4:1 | — | 88.9 | 85.2 | 89.5 | 10.2 |
| Embodiment 11 | Compound 5:1 | — | 85.8 | 81.9 | 84.6 | 15.8 |
| Embodiment 12 | Compound 6:1 | — | 87.1 | 83.2 | 86.5 | 11.9 |
| Embodiment 13 | Compound 7:1 | — | 86.8 | 82.6 | 85.6 | 13.8 |
| Embodiment 14 | Compound 8:1 | — | 88.4 | 85.0 | 88.5 | 10.7 |
| Embodiment 15 | Compound 9:1 | — | 85.1 | 81.2 | 84.1 | 17.6 |
| Embodiment 16 | Compound 1:1 | VC: 1.0 | 90.6 | 87.5 | 89.8 | 12.8 |
| Embodiment 17 | Compound 1:1 | FEC: 1.0 | 89.9 | 83.5 | 87.8 | 17.6 |
| Embodiment 18 | Compound 1:1 | DTD: 1.0 | 89.5 | 86.8 | 89.8 | 10.6 |
| Embodiment 19 | Compound 1:1 | Tripropargyl phosphate: 1.0 | 89.6 | 86.3 | 88.5 | 8.2 |
| Comparative example 1 | — | — | 56.3 | 61.9 | 64.3 | 64.4 |
| Comparative example 2 | — | VC: 1.0 | 83.2 | 78.7 | 81.1 | 25.1 |
| Comparative example 3 | — | FEC: 1.0 | 86.6 | 72.0 | 75.9 | 30.8 |
| Comparative example 4 | — | DTD: 1.0 | 85.3 | 80.9 | 84.3 | 19.1 |
| Comparative example 5 | | Tripropargyl phosphate: 1.0 | 85.6 | 80.0 | 81.9 | 16.8 |
| Comparative example 6 | — | VC: 1.0 DTD: 1.0 | 86.9 | 82.0 | 85.9 | 22.6 |
| Comparative example 7 | Compound 10:1 | — | 83.2 | 80.5 | 83.1 | 23.5 |
| Comparative example 8 | Compound 11:1 | — | 82.1 | 77.5 | 80.9 | 25.2 |
| Comparative example 9 | Compound 12:1 | — | 82.3 | 78.9 | 82.6 | 22.2 |

From the test results of Embodiments 1-7 and Comparative example 1, it can be seen that the addition of one of the bicyclic compounds represented by structural formulas 1-1 to 1-3 in the electrolyte can improve the high-temperature performance of battery in a large addition range. And with the increase of the content of one of the bicyclic compounds represented by structural formulas 1-1 to 1-3, the high-temperature storage performance of the battery would first increase and then decrease. Especially, when the content of compound is 1%, the battery has the best overall performance. This may be because when the content of bicyclic compound in the electrolyte is 0.5-3.0% during the charge-discharge cycle of lithium ion batteries, the SEI film may be formed with moderate thickness and better stability.

From the test results of Embodiment 4 and Embodiments 16-19, it can be seen that compared with the way of adding only one of the bicyclic compounds represented by structural formulas 1-1 to 1-3, when the combination of one of the bicyclic compounds represented by structural formulas 1-1 to 1-3 and vinylene carbonate (VC) is added, the high-temperature cycle performance of battery is improved more obviously. It indicates that the passivation film formed by both the compound represented by structural formula 1 and vinylene carbonate (VC) has good high temperature stability.

From the test results of Embodiment 18 and Comparative example 6, it can be seen that compared with the conventional combination additives of vinylene carbonate (VC) and ethylene sulfate (DTD), when the one of the bicyclic compounds represented by structural formulas 1-1 to 1-3 provided by this application is combined with vinyl sulfate (DTD), a further improvement is shown. It indicates that the passivation films formed by the compounds represented by structural formulas 1-1 to 1-3 have more excellent high-temperature stability.

From the test results of Embodiment 4 and Comparative example 7, it can be seen that the overall improvement of high-temperature performance in Embodiment 4 is more obvious, which may be attributed to the fact that there is a hydrocarbon group between the double rings of the compound represented by structural formula 1-1 provided by this application. On the one hand, the symmetrical distribution of molecular polar groups can be reduced, and the possibility of uniform distribution of the net charge in the molecule can be reduced, so that it is easier to coordinate with lithium ions and reach the negative electrode for reduction. On the other hand, the freedom of movement of the two rings can be increased, so that the products formed by the two rings can be closely combined with the negative electrode and have higher flexibility, thus the overall performance of the lithium ion battery can be improved more obviously.

From the test results of Embodiment 8 and Comparative examples 7-8, it can be seen that the overall improvement of high-temperature performance in Embodiment 8 is more obvious, which may be attributed to the fact that the SEI film formed by bicyclic compound represented by structural formula 1-2 provided by this application contains both inorganic component and organic component. This SEI film is a more uniform organic-inorganic composite film at the atomic scale, which can not only improve the lithium ion conduction rate, but also protect the positive and negative electrode structures, improve the stability of battery materials, and better isolate the contact between positive/negative electrode material and electrolyte, thus reducing the battery polarization, inhibiting the impedance growth and improving the high-temperature performance of battery.

From the test results of Embodiment 12 and Comparative example 9, it can be seen that the high-temperature performance in Embodiment 12 is better, which may be attributed to the fact that the SEI film formed by bicyclic compound represented by structural formula 1-2 provided by this application contains both inorganic component and organic component. This SEI film is a more uniform organic-inorganic composite film at the atomic scale, which can not only improve the lithium ion conduction rate, but also protect the positive and negative electrode structures, improve the stability of battery materials, and better isolate the contact between positive/negative electrode material and electrolyte, thus reducing the battery polarization, inhibiting the impedance growth and improving the high-temperature performance of battery.

To sum up, the non-aqueous electrolyte and lithium ion battery provided by this application contain one of the bicyclic compounds represented by structural formulas 1-1 to 1-3, which can enable the lithium ion battery to form a stable SEI film during charging and discharging, and improve the electrochemical performance of the lithium ion battery at high temperature.

The application has been further described with the above specific embodiments, but it should be understood that the specific description here should not be construed as limiting the essence and scope of the application. Various modifications made to the above embodiments by those skilled in the art after referring to this specification belong to the protection scope of this application.

The invention claimed is:

1. A non-aqueous electrolyte, comprising a solvent, a lithium salt, and at least one of bicyclic compound represented by structural formulas 1-1 to 1-3:

Structural formula 1-1

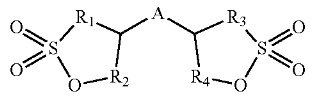

wherein A is selected from a carbonyl group, a C1-C10 hydrocarbon group, a C1-C10 halogenated hydrocarbon group or a C2-C10 carbonyl-containing hydrocarbon group, $R_1$, $R_2$, $R_3$ and $R_4$ are each independently selected from a single bond, a C1-C5 hydrocarbon group or a C1-C5 halogenated hydrocarbon group;

Structural formula 1-2

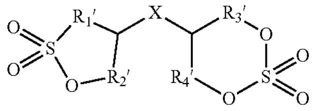

wherein X is selected from a single bond, a carbonyl group, a C1-C10 hydrocarbon group, a C1-C10 halogenated hydrocarbon group or a C2-C10 carbonyl-containing hydrocarbon group, $R_1'$, $R_2'$, $R_3'$ and $R_4'$ are each independently selected from a single bond, a C1-C5 hydrocarbon group or a C1-C5 halogenated hydrocarbon group;

Structural formula 1-3

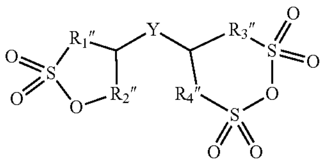

wherein Y is selected from a single bond, a carbonyl group, a C1-C10 hydrocarbon group, a C1-C10 halogenated hydrocarbon group or a C2-C10 carbonyl-containing hydrocarbon group, and $R_1''$, $R_2''$, $R_3''$ and $R_4''$ are each independently selected from a single bond, a C1-C5 hydrocarbon group or a C1-C5 halogenated hydrocarbon group.

2. The non-aqueous electrolyte of claim 1, wherein the bicyclic compound represented by structural formula 1-1 is selected from one or more of the following compounds:

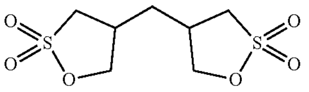

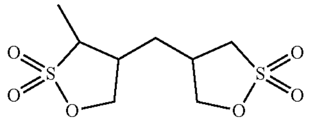

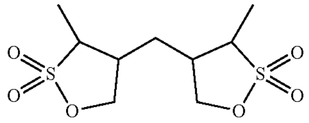

-continued
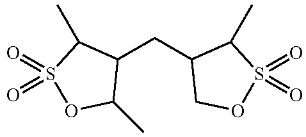
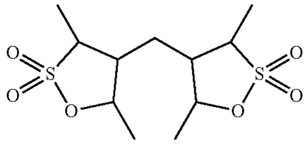
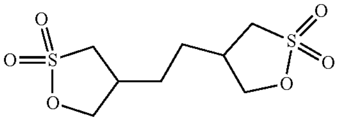
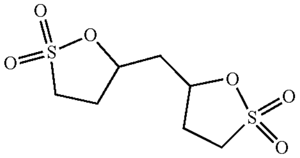
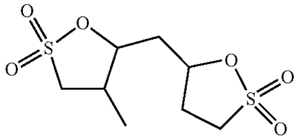
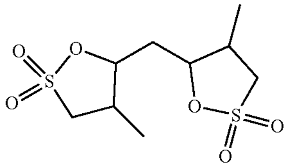
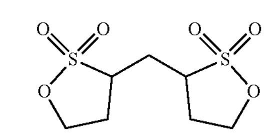
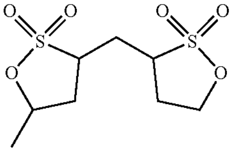
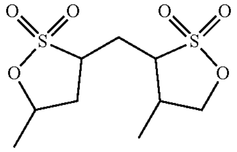
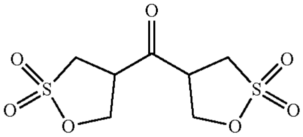
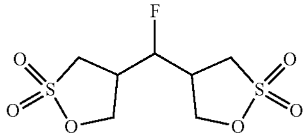
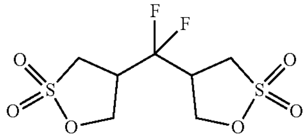
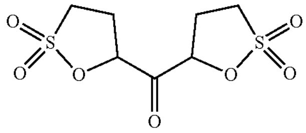
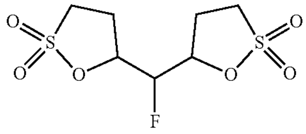
-continued
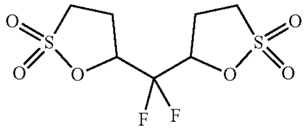
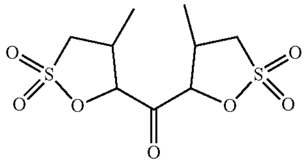
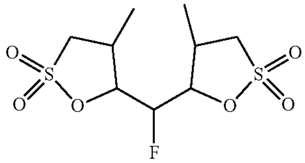
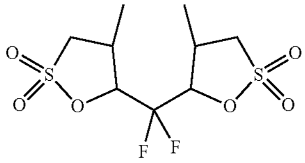
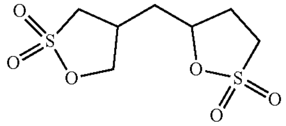
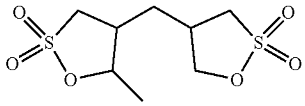
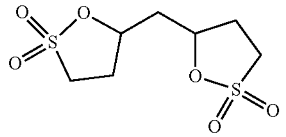
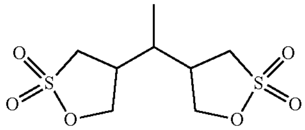
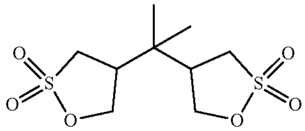
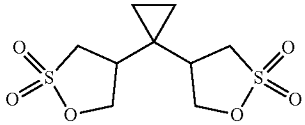
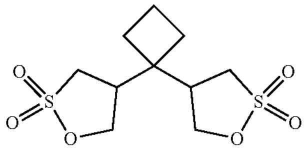
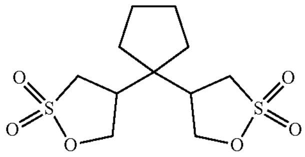

-continued
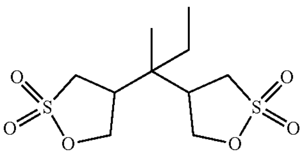
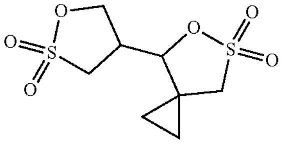
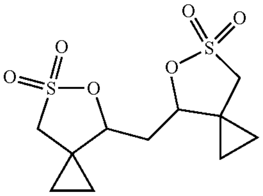
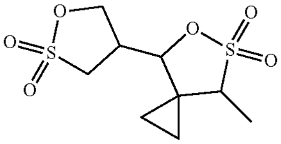
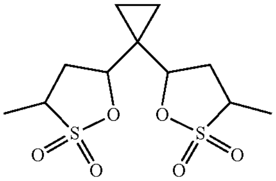
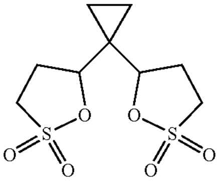
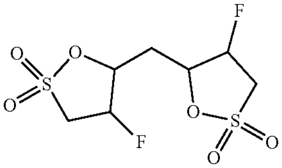
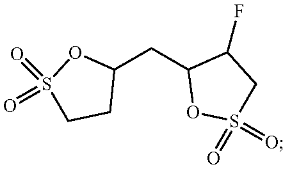
the bicyclic compound represented by structural formula 1-2 is selected from one or more of the following compounds:
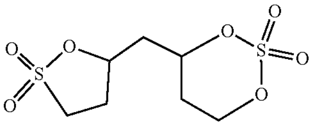
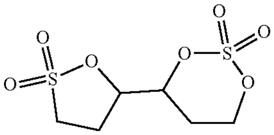
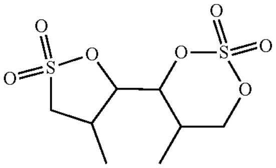
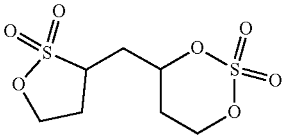
-continued
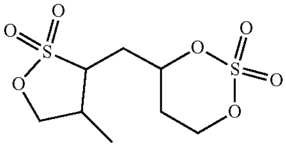
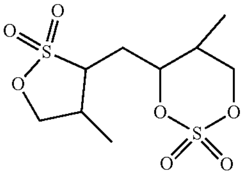
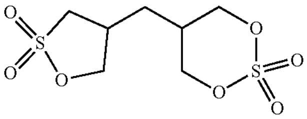
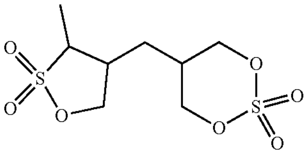
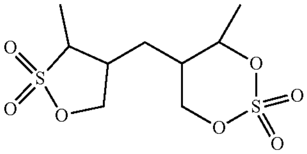
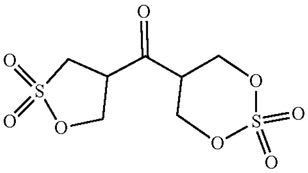
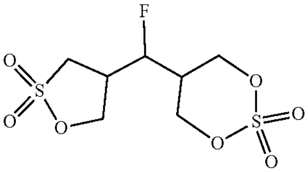
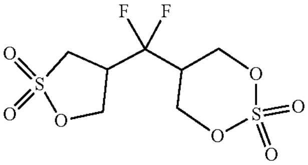
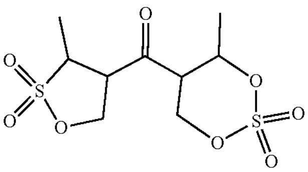
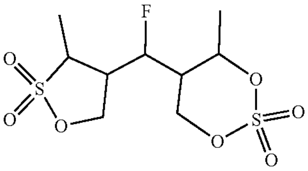

-continued
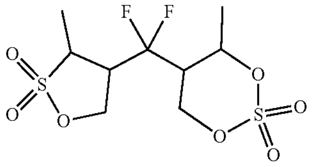
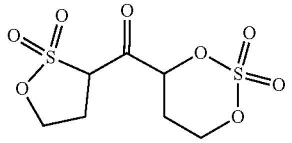
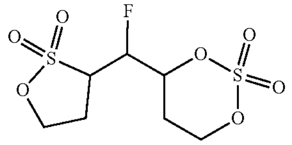
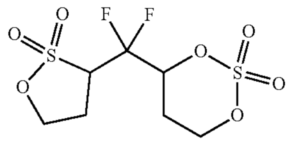
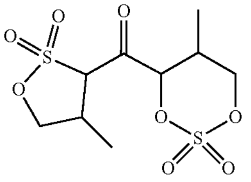
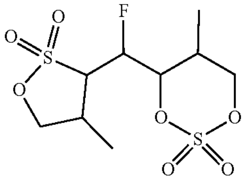
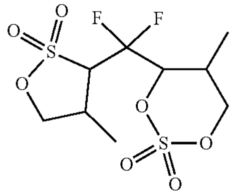
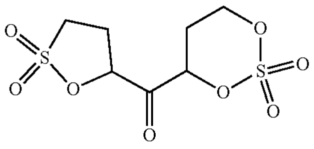
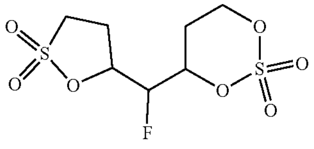
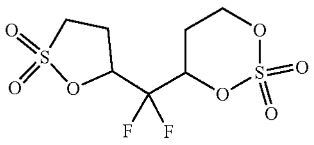
-continued
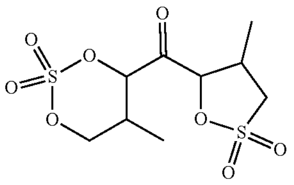
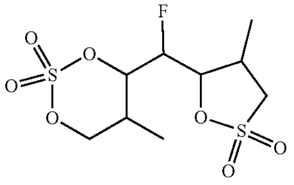
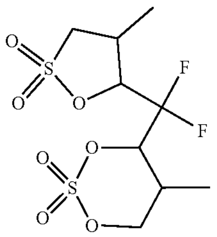
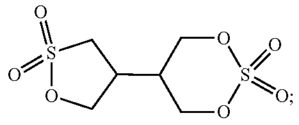
the bicyclic compound represented by structural formula 1-3 is selected from one or more of the following compounds:
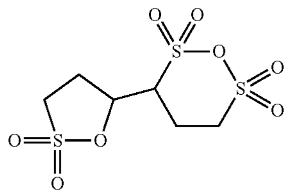
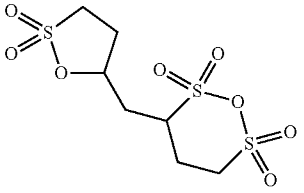
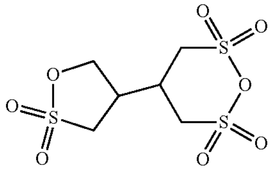
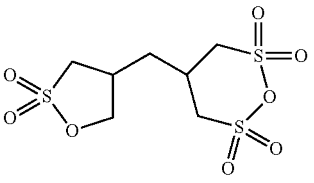

-continued

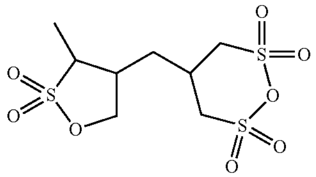

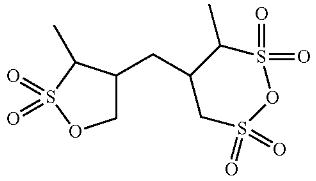

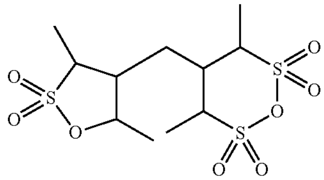

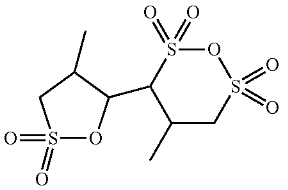

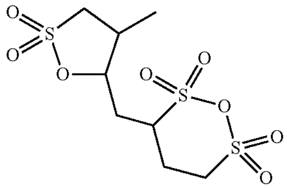

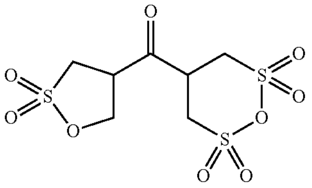

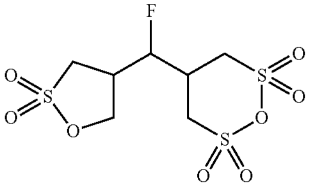

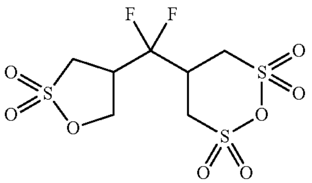

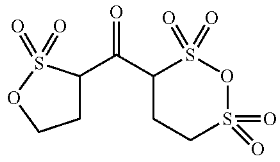

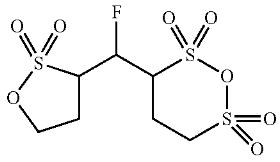

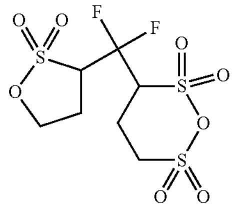

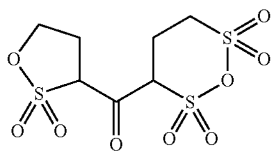

-continued

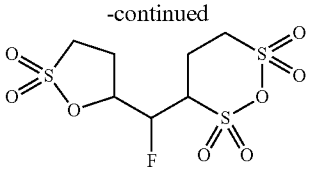

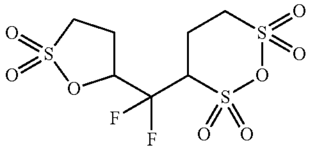

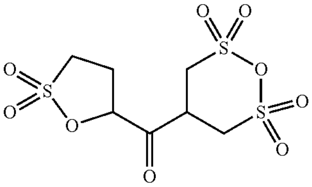

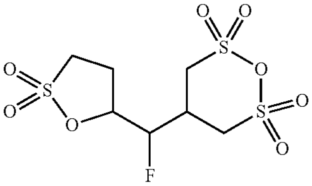

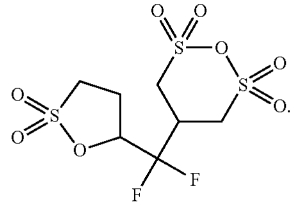

3. The non-aqueous electrolyte of claim 1, wherein a mass percentage of the bicyclic compound is 0.01%- 5.0% based on the total mass of the non-aqueous electrolyte being 100%.

4. The non-aqueous electrolyte of claim 1, wherein the non-aqueous electrolyte further comprises at least one of cyclic sulfate compound, cyclic sulfonate compound, cyclic carbonate compound, unsaturated phosphate compound and nitrile compound.

5. The non-aqueous electrolyte of claim 4, wherein the cyclic sulfate compound is selected from at least one of ethylene sulfate, propylene sulfate or methyl ethylene sulfate;

the cyclic sulfonate compound is selected from at least one of 1,3-propane sultone, 1,4-butane sultone and 1,3-propene sultone;

the cyclic carbonate compound is selected from at least one of vinylene carbonate, vinylethylene carbonate, fluoroethylene carbonate or a compound represented by structural formula 2;

Structural formula 2

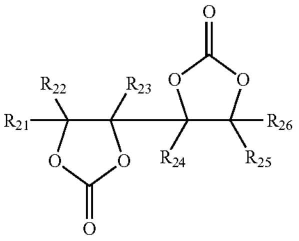

in structural formula 2, $R_{21}$, $R_{22}$, $R_{23}$, $R_{24}$, $R_{25}$ and $R_{26}$ are each independently selected from one of a hydrogen atom, a halogen atom and a C1-C5 group;

the unsaturated phosphate compound is selected from at least one compound represented by structural formula 3:

Structural formula 3

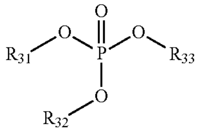

$R_{31}$, $R_{32}$ and $R_{32}$ are each independently selected from a C1-C5 saturated hydrocarbon group, a C1-C5 unsaturated hydrocarbon group, a C1-C5 halogenated hydrocarbon group and —$Si(C_mH_{2m+1})_3$, m is a natural number of 1-3, and at least one of $R_{31}$, $R_{32}$ and $R_{32}$ is an unsaturated hydrocarbon group; and the nitrile compound comprises one or more of butanedinitrile, glutaronitrile, ethylene glycol bis (propionitrile) ether, hexanetricarbonitrile, adiponitrile, pimelic dinitrile, hexamethylene dicyanide, azelaic dinitrile and sebaconitrile.

6. The non-aqueous electrolyte of claim 4, characterized in that, based on the total mass of the non-aqueous electrolyte being 100%, a mass percentage of the cyclic sulfate compound is 0.1-5.0%, a mass percentage of the cyclic sulfonate compound is 0.1-5.0%, a mass percentage of the cyclic carbonate compound is 0.1-5.0%, a mass percentage of the cyclic carbonate compound is 0.1%- 5.0%, a mass percentage of the unsaturated phosphate compound is 0.1%-2.0%, and a mass percentage of the nitrile compound is 0.1%- 5.0%.

7. The non-aqueous electrolyte of claim 1, wherein the lithium salt is selected from at least one of $LiPF_6$, LiBOB, LiDFOB, $LiPO_2F_2$, $LiBF_4$, $LiSbF_6$, $LiAsF_6$, $LiN(SO_2CF_3)_2$, $LiN(SO_2C_2F_5)_2$, $LiC(SO_2CF_3)_3$, $LiN(SO_2F)_2$ and LiBETI.

8. The non-aqueous electrolyte of claim 1, wherein the solvent comprises at least one of ethylene carbonate, propene carbonate, butylene carbonate, dimethyl carbonate, diethyl carbonate, ethyl methyl carbonate and methyl propyl carbonate.

9. A lithium ion battery, comprising a positive electrode, a negative electrode, a separator and the non-aqueous electrolyte of claim 1.

10. The lithium ion battery of claim 9, wherein the positive electrode comprises a positive electrode active material selected from at least one of $LiNi_xCo_yMn_zM_{1-x-y-z}O_2$, $LiCo_{1-y}M_yO_2$, $LiNi_{1-y}M_yO_2$, $LiMn_{2-y}M_yO_4$ and $LiFe_{1-x'}N_{x'}PO_4$; M is selected from at least one of Fe, Co, Ni, Mn, Mg, Cu, Zn, Al, Sn, B, Ga, Cr, Sr, V or Ti, and $0 \leq y \leq 1$, $0 \leq x \leq 1$, $0 \leq z \leq 1$, $x+y+z \leq 1$; and N is selected from at least one of Mn, Mg, Co, Ni, Cu, Zn, Al, Sn, B, Ga, Cr, Sr, V or Ti, and $0 \leq x' < 1$.

* * * * *